United States Patent [19]

Alexander et al.

[11] Patent Number: 4,753,695
[45] Date of Patent: Jun. 28, 1988

[54] APPARATUS AND A METHOD FOR REPAIRING A WINDSHIELD

[76] Inventors: George E. Alexander, 63065 Sherman Rd., Ste. E, Bend, Oreg. 97701; Von L. Alexander, 61233 Mount Vista Dr.; Thomas R. Spoo, 60388 Woodside Loop, both of Bend, Oreg. 97002

[21] Appl. No.: 20,548

[22] Filed: Mar. 2, 1987

[51] Int. Cl.⁴ .......................................... B32B 35/00
[52] U.S. Cl. ...................................... 156/94; 264/36; 425/12; 425/13; 428/63
[58] Field of Search .............. 156/94; 264/36; 425/12, 425/13; 428/63

[56] References Cited

U.S. PATENT DOCUMENTS

| | | |
|---|---|---|
| 2,837,767 | 6/1958 | MacDonald . |
| 3,562,366 | 2/1971 | Sohl ................................. 264/36 X |
| 3,765,975 | 10/1973 | Hollingsworth ..................... 156/94 |
| 3,993,520 | 11/1976 | Werner et al. ...................... 156/94 |
| 4,132,516 | 1/1979 | Story ................................. 425/13 |
| 4,200,478 | 4/1980 | Jacino et al. ........................ 156/94 |

Primary Examiner—Robert A. Dawson
Attorney, Agent, or Firm—Thomas W. Secrest

[57] ABSTRACT

This invention is directed to an apparatus and method for repairing pock marks and bullseyes in glass such as a windshield and such as plate glass. The apparatus comprises essentially an adapter, a syringe and a polymerizable resin. The adapter is attached to the glass over the pock mark or bullseye. The syringe with the polymerizable resin is positioned in the adapter and the polymerizable resin forced into the pock mark or bullseye.

8 Claims, 2 Drawing Sheets

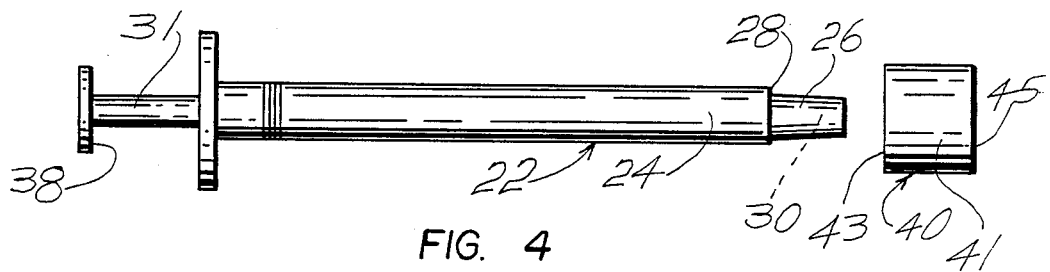
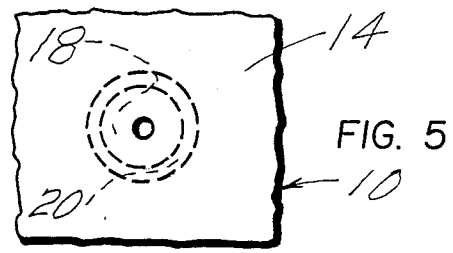
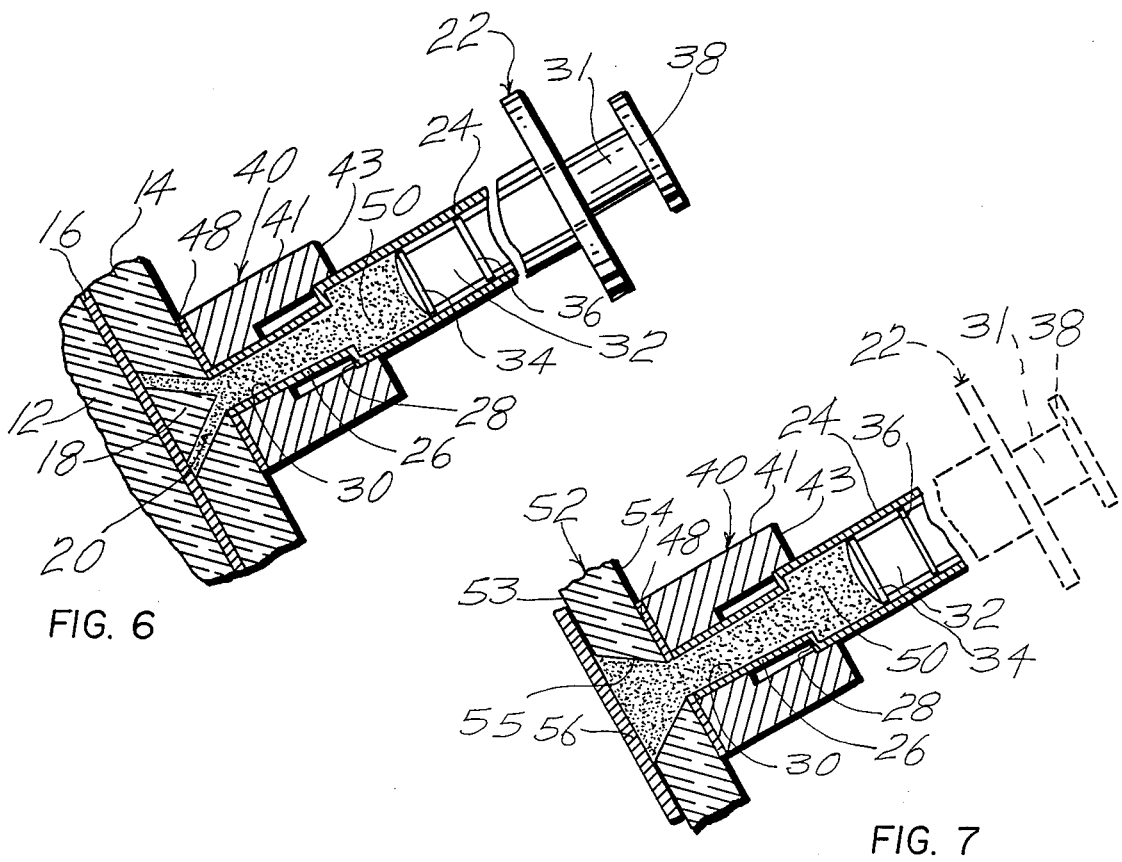

APPARATUS AND A METHOD FOR REPAIRING A WINDSHIELD

THE BACKGROUND OF THE INVENTION

1. Field of the Invention

An object strikes glass and causes a break or a crack in the glass.

An example is a first automobile on a road. A tire of a second automobile kicks up or dislodges a rock. This rock strikes the windshield or window in the first automobile and forms a bullseye or a crack in the windshield or window. In many instances the bullseye or crack can be repaired thereby obviating the necessity of replacing the windshield or window.

Another example is the tire of an automobile may dislodge a rock and cause the rock to fly through the air. The rock strikes a plate glass window and forms a crack or knocks out some of the glass to form a hole. Again, in many instances it may be possible to repair a small crack in a plate glass window or to repair a hole in the plate glass window. Again, it is not necessary to replace the plate glass window in such an instance.

2. The Prior Art

The prior art known to the applicants is:

| NAME | NUMBER |
| --- | --- |
| Sohl | 3,562,366 |
| Hollingsworth | 3,75,975 |
| Werner et al | 3,993,520 |

Sohl teaches of extinguishing pock marks in automobile windshields by completely filling the pock marks with liquid resin under high frequency vibration and polymerizing the resin. The windshield is left in place during the repair operation.

Hollingsworth teaches of in-place permanent repair of pock marked windshields by using a vibrationless application of curable liquid resin under defined conditions of temperature and pressure.

Werner et al teaches of using a bridge member to assist in positioning an injector tube over the break in the windshield. Then, the injector tube injects a curable liquid resin into the break. The bridge member assists in positioning the injector tube so as to have a positive alignment of the injector tube with the break in the windshield.

A SUMMARY OF THE INVENTION

The invention comprises an apparatus for filling a bullseye or a crack or a hole in a glass; the method of filling the bullseye or crack or hole in the glass; and, a repaired glass having had a bullseye or a crack or a hole.

The apparatus employed comprises an adapter. The adapter has a passageway for receiving the tip of an injector tube. The adapter is bonded to the glass over the crack or the hole in the glass. Then, the injector tube is positioned in the passageway in the adapter and a polymerizable resin is poured through the passageway in the adapter and into the hole or crack or bullseye in the glass.

The adapter is bonded to the glass by an adhesive. The adhesive has a number of functions such as to position the adapter on the glass; to preclude air leakage from outside of the adapter to the hole or crack or bullseye in the glass; and to preclude resin leakage from the passageway in the adapter and between the windshield and the adapter. In effect, the adhesive functions in a duel capacity as a bonding agent to bond the adapter to the glass and also as a gasket to prevent air leakage between the adapter and the glass and also as a gasket to prevent resin leakage between the adapter and the glass.

THE DRAWINGS

In the drawings it is seen:

FIG. 4 is a side view of the syringe and adapter in a seperated state;

FIG. 5 is a front view of glass such as a windshield or plate glass and shows a pock mark or a bullseye;

FIG. 6 is a fragmentary cross-sectional view of glass such as a windshield with a pock mark or bullseye, an adapter positioned over the bullseye and a syringe positioned in the adapter;

FIG. 7 is a fragmentary cross-sectional view of plate glass with a pock mark or bullseye and a syringe positioned in the adapter.

THE SPECIFIC DESCRIPTION OF THE INVENTION

Figure 1:
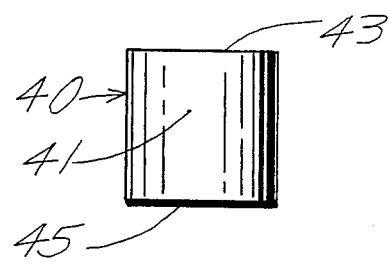
FIG. 1 is a side elevational view of the adapter.
Figure 2:
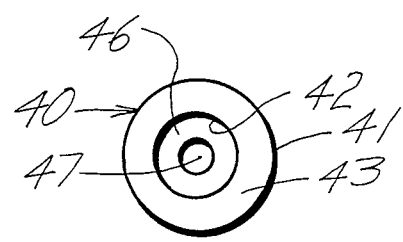
FIG. 2 is a first end elevational view of the adapter.
Figure 3:
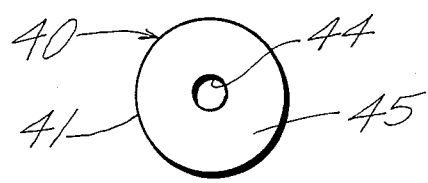
FIG. 3 is a second end elevational view of the adapter.

A disclosure of the invention is made with reference to FIG. 6. An example of the use of the invention is made with reference to windshield 10 having a conical glass segment 18 or a bullseye 20 or a pock mark 20 or a break 20 or a open tipped cavity 20. A windshield has an inner glass panel 12, an outer glass panel 14 and a central plastic film 16. The central plastic film 16 is bonded between the inner panel 12 and outer panel 14. In case a rock or other hard object hits the windshield and breaks the windshield the central plastic film 16 assists in preventing the inner glass panel 12 shattering and, possibly, spraying pieces of glass over the occupants of the automotive vehicle. The outer glass panel 14 may be damaged or broken by the rock. If the rock is not too large the central plastic film assists in absorbing some of the shock of the rock hitting the outer glass panel and also functions as an adhesive to prevent the inner glass panel breaking and shattering. In FIG. 6 there is a fragmentary side elevational view illustrating the aftereffect of small rock or solid object hitting the windshield 10 and contacting the outer glass panel 14. The result is often a break or pock mark in the outer glass panel 14 forming a conical glass segment 18. Segment 18 is usually bonded to the central plastic film 16. The inner glass panel 12 is not hurt or shattered or broken.

With the passage of time and the change in temperature and the change in weather conditions from sunshine to rain to snow and the accumulation of dust and the like and general ageing the outer glass panel 14 around the concial glass segment 18 and also the central plastic film 16 may change. Further, with the conical glass segment 18 and the open tipped cavity 20 there is a weakening of the outer glass panel 14. In time, due to the changing weather conditions, there may be cracks radiating in the outer glass panel 14 and away from the conical glass segment 18 and also the open tipped cavity 20. In many instances it is possible to reduce the damage to the windshield 10 resulting from a rock or a solid object hitting the outer glass panel 14. The reduction in damage can be realized by injecting a polymerizable resin into the open tipped cavity 20 in the outer glass panel 14. The polymerizable resin will bond to the outer glass panel 14 and also to to the conical glass segment 18. After the polymerizable liquid resin has been introduced into the open tipped cavity 20 and allowed to cure there is a resulting polymerized resin bonded to the panel 14 and also to the segment 18. The excess polymerized resin can be removed and the exposed surface of the glass panel 14 buffed. Many times the pock mark 20 and conical glass segment 18 are completely obliterated and are not seen by an observer. Further, the windshield is strengthened and there is not the potential damage from the change in weather conditions such as sunshine, rain and snow and dust. With this insertion of the polymerizable liquid resin into the open tipped cavity 20 it is possible to repair a windshield for a low cost and to prevent cracks radiating from the open tipped cavity 20 and thereby lessening the expense of maintaining an automotive vehicle as compared with replacing a damaged windshield in the automotive vehicle.

Also, with a hole in glass such as plate glass, see FIG. 7, it is possible to repair the hole. This makes it possible to continue to use the plate glass and therefore eliminate the expense of replacement.

A windshield or a plate glass is exposed to the weather and collects some dust, dirt, maybe a little oil and the like. The surface is dirty and also the pock mark or bullseye or break is dirty. Before applying the polymerizable resin to a dirty surface it is advisable to clean the surface. If the polymerizable resin be applied to the dirty surface it may be that there will not be a good bond between the resin and the glass. Therefore, it may be advisable to wash with a cleaning solution such as soap and water or detergent and water. After washing and cleaning it is advisable to dry the glass. To further insure a clean surface the surface may be wiped with a cloth slightly moistened with ethyl alchohol, rubbing alcohol, acetone, methylethyl ketone, or other suitable volatile solvents. Naturally, in preparing the glass for receiving the polymerizable resin any stray pieces of glass or other material are removed from the pock mark or bullseye or break.

In FIG. 6 there is illustrated a windshield 10. The windshield 10 has an inner glass panel 12, an outer glass panel 14 and a central plastic film 16. The windshield 10 after being hit by an object such as a rock has developed a conical glass segment 18 or a pock mark 20 or a bullseye 20. The conical glass segment 18 is adhered to the central plastic film 16. There is a open tipped cavity 20 between the segment 18 and the outer glass panel 14.

A syringe 22 is used to assist in repairing the break 20 or bullseye 20 in the windshield 10. The syringe 22 comprises a barrel 24 and a tip 26. A shoulder 28 is positioned between the tip 26 and the barrel 24. The barrel 24 is hollow for storing a liquid polymerizable resin and there is a passageway 30 in the tip 26 for directing the liquid polymerizable resin to the pock mark 20 or bullseye 20 in the glass panel 14 so as to fill the open tipped cavity 20.

The syringe 22 comprises a plunger 31 movable in the barrel 24. On the inner end of the plunger 31 there is a plastic tip or a plastic end 32. The plastic end 32 can be of rubber or other suitable material. The plastic end 32 slides over the end of the plunger 31. The plastic end 32 has an outer circular rim 34 and an inner circular rim 36. On that part of the plunger 31 outside of the barrel 24.

As part of this invention there is an adapter 40. The adapter 40 can be of a deformable or a pliable material such as rubber or plastic. The adapter 40 can have any generally outside configuration although one easy configuration is of a right circular body 41. In other words the body 41 can be in the configuration of a modified right circular cylinder. There is a large circular recess 42 in the end 43 and a small circular recess 44 in the end 45. At the junction of the large circular recess 42 and the small circular recess 44 there is a shoulder 46. The recesses 42 and 44 form a passageway 47 for receiving the tip 26. The tip 26 can be positioned in the two recesses 42 and 44 or passageway 47 and due to the varying sizes of the two recesses the tip 26 is firmly held in position.

In FIG. 6 it is seen that the adapter 30 is positioned next to the outer glass panel 14 of the windshield 10. An adhesive 48 is positioned between the glass panel 14 and the adapter 40. This adhesive 48 firmly bonds the adapter 40 to the glass panel 14.

In use, after the windshield 10 has been cleaned, the liquid adhesive 48 can be applied to the glass panel 14 around the bullseye 20 or conical glass segment 18. Then, the adapter 40 can be positioned on the adhesive 48 with the small circular recess 46 positioned near the opening of the open tipped cavity 30 in the glass panel 14. After a few seconds or a minute adhesive 48 cures and the adapter 40 is firmly positioned on the windshield 10. The syringe 22 can be forced into the large circular recess 44 and into the small circular recess 46 in the adapter 40 so that the end of the tip 26 is adjacent to or close to the open tipped cavity 20. There is a polymerizable resin 50 in the barrel of the syringe 22. The reader is to understand that the adhesive 48 serves at least two purposes of which one purpose is to firmly bond the adapter 40 to the windshield 10 and the other purpose is to function as a gasket to prevent leakage of air from outside the adapter 40 to the open tipped cavity 20 and also to prevent the flow of liquid polymerizable resin 50 from the open tipped cavity 20 to that part of the windshield 10 outside of the adapter 40.

In the repairing of the windshield 10 the operator or repair person can retract the plunger 31 a short distance to evacuate air or gas from the open tipped cavity 20. After the air or gas has been evacuated and in the barrel 24 of the syringe 20 the plunger 31 can be forced toward the tip 26 to expel or force the liquid polymerizable liquid 50 into the open tipped cavity 20.

In a few minutes the liquid polymerizable resin 40 in the formerly open tipped cavity 20 polymerizes and becomes a polymerized resin which is solid. Then, the adapter 30 and the syringe 22 can be removed from the windshield 10. It may be necessary to take a razor blade and to cut the adapter 40 away from the windshield 10. After the adapter 40 has been removed it is possible to take a razor blade and to remove the adhesive 48. Also, any excess solid polymerized resin on the windshield 10 can be removed by a razor blade or other suitable means. An artisan can buff the windshield. In this manner the bullseye 20 or crack 20 or pock mark 20 in the windshield 10 is repaired and precludes further weathering due to the elements such as sunshine, rain, snow and the like.

In FIG. 7 there is illustrated the repair of a sheet of glass 52 such as plate glass 52 having a first surface 53 and a second surface 54. There is a conical hole 55 in the plate glass 52. A person can apply a stop 56 on the first surface 53 on the large end of the hole in the plate glass 52. This stop 56 can be a patch such as another piece of glass or rubber or even removable tape. Then, the adapter 40 can be applied to the plate glass 52 on the second surface 54 of the plate glass 52 by means of the adhesive 48. After the adapter is firmly positioned on the plate glass 52 the syringe 22 can be positioned in the adapter as previously stated with respect to the windshield 10. Again, the syringe 22 has the liquid polymerizable resin 50 in the barrel 24. The artisan can retract the plunger 31 in the syringe 22 so as to remove air from the conical hole 55. After the air has been removed the artisan can force the plunger 31 into the syringe 22 to force the liquid polymerizable resin 50 into the conical hole 55. After the liquid polymerizable resin 50 has cured and becomes polymerized solid resin the stop 56 can be removed from the first surface 53 of the plate glass 52. The adapter 40, the adhesive 48 and any excess solid polymerized resin can be removed from the second surface 54 of the plate glass 52. The plate glass can be buffed on both surfaces 53 and 54 so as to have a finished appearance to the repair of the conical hole 55 in the plate glass 52.

From the foregoing description of the invention and its use and repair capabilities in repairing a hole or a pock mark or a bullseye in a sheet of glass we think that we have provided a small, easily stored, easily transported and easily used apparatus; also, we have provided an inexpensive apparatus comprising a syringe, an adapter which can be easily molded, a readily available adhesive for applying the adapter to the windshield and also a readily available liquid polymerizable resin; there has been provided an easily manipulated apparatus by which an artisan can readily repair a damaged sheet of glass such as plate glass or a windshield; an easily manipulated and mastered apparatus by which an artisan can readily learn how to use the apparatus and repair the sheet of glass; an apparatus and method that apply only on that part of the glass with the bullseye or pock mark or break; an apparatus and method which applies substantially no pressure on the glass and therefore will not enlarge the break or pock mark or bullseye and will not damage the glass; an apparatus and method which precludes the necessity of a supporting frame or bridge for positioning the syringe with respect to the pock mark or break or bullseye in the glass; and, an apparatus and method which precludes the need for an O-ring.

An appropriate adhesive 48 is "Extra Strength Krazy Glue Gel", a product of Krazy Glue, Inc. Itasca, Ill., 60143. This adhesive contains cyanoacrylate.

An appropriate polymerizable resin 50 is "Crack-Weld Windshield Repair Liquid", also a product of Krazy Glue, Inc. This polymerizable resin contains cyanoacrylate and further contains acrylic acid and methacrylic ester.

The invention is new and unobvious as the applicants know of no similar invention for repairing a bullseye or pock mark in glass. The invention comprises, essentially, an adapter 40, an adhesive 48 for applying the adapter 40 to the glass, a small syringe 22 and a polymerizable resin 50. The inventors argue that none of the references teach of such an apparatus and method. Werner, U.S. Pat. No. 3,993,520, teaches of a bridge member 20, suction cups and injector assembly 27, syringe 35 and resin. With the inventors invention it is not necessary to have the bridge member 20 and suction cups and the injector assembly 27.

Hollingsworth, U.S. Pat. No. 3,765,975, teaches of a block 16, threaded screw 23, O-ring 19, syringe 25 and needle 26. The inventors do not need a block 16, a threaded screw 23, an O-ring 19 and a needle 26.

Sohl, U.S. Pat. No. 3,562,366, teaches of a block 40, a probe 43, O-rings 47 and 48 and a socket 50. The inventors do not need a block 40, a probe 43, O-rings 47 and 48 and socket 50.

Again, in view of the references known to the inventors the inventors advance the argument that this invention is new and unobvious.

The inventors advance the argument that the invention is useful as it is used for repairing a pock mark or a bullseye in glass such as a windshield or in plate glass.

From the foregoing it is seen that we have provided an apparatus for injecting a liquid repair material into a crack in glass. The apparatus comprises an injector tube, an adapter, said injector tube has a tip, said tip has a passageway to allow the flow of said liquid repair material, said adapter has a first means for receiving said tip and for allowing the flow of said liquid repair material and for positioning said tip close to said crack of glass, a bonding means for bonding said adapter to said windshield. Also, said adapter is deformable and said first means is a passageway.

Further we have provided a method for injecting a liquid repair material into a crack in glass and wherein said method comprises positioning an adapter over said crack in glass, bonding said adapter to said glass with said adapter positioned over said crack of glass, said adapter has a first means for receiving a tip and for allowing the flow of said liquid repair material and for positioning said tip close to said crack of glass, and, flowing said liquid repair material through said first means and into said crack of glass. The method further provides removing said adapter from said glass and finishing said glass in the area of said crack of glass. The method also provides positioning an adhesive between said adapter and said glass for bonding said adapter to said glass, said adhesive functions as a gasket to prevent the flow of said liquid repair material outwardly from said tip and outside of said adapter, and, said adhesive functions as a gasket to prevent the flow of gas from outside said adapter to said crack of glass.

Further we repair a crack in the glass by a method comprising positioning an adapter over said crack, bonding said adapter to said glass with said adapter positioned over said crack, said adapter having a first means for receiving a tip and for allowing the flow of a liquid repair material and for positioning said tip close to said crack, and, flowing said liquid repair material through said first means and into said crack. In addition a crack in glass is repaired by a method comprising removing said adapter from the vicinity of said crack in glass, finishing said glass in the area of said crack. Also, the crack in glass is repaired by positioning an adhesive between said adapter and said glass for bonding said adapter to said glass, said adhesive functions as a gasket to prevent the flow of said liquid repair material outwardly from said tip and outside of said adapter, and said adhesive functions as a gasket to prevent the flow of gas from outside said adapter to said crack of glass.

What we claim is:

1. An apparatus for injecting a liquid repair material into a crack in glass, said apparatus comprising:
   a. an adapter;
   b. said adapter having a first end and a second end;
   c. said adapter having a large circular recess in said first end and a small circular recess in said second end;

d. said large circular recess and said small circular recess uniting to form a passageway and to define a shoulder at their junction;

e. a syringe having a barrel, a tip and a movable plunger in said barrel and said liquid repair material being in said barrel;

f. said tip of said syringe being in said small circular recess and bearing against said adapter to be positioned in said adapter and juxtapositioned to said second end for allowing said liquid repair material to flow from said syringe and from said tip to said glass; and, g. a bonding means for bonding said second end of said adapter to said glass.

2. An apparatus according to claim 1, said apparatus comprising:

a. the end of said tip of said syringe extending to said second end of said adapter.

3. An apparatus according to claim 1 and comprising:

a. said adapter being deformable.

4. A method for injecting a liquid repair material into a crack in glass, said method comprising:

a. positioning an adapter over said crack in said glass;

b. said adapter having a first end and a second end;

c. said adapter having a large circular recess in said first end and a small circular recess in said second end;

d. said large circular recess and said small circular recess uniting to form a passageway and to define a shoulder at their junction;

e. bonding said second end of said adapter to said glass with a bonding means with said small circular recess of said adapter positioned over said crack in said glass;

f. positioning in said passageway a syringe having a barrel, a tip and a movable plunger in said barrel and said liquid repair material being in said barrel with said tip of said syringe being in said small circular recess and bearing against said adapter to be positioned in said adapter and juxtapositioned to said second end for allowing said liquid repair material to flow from said syringe and from said adapter to said glass;

g. bonding said adapter to said glass with a bonding means to prevent the flow of said liquid repair material between said adapter and said glass and also to prevent the flow of gas from outside said adapter to said crack in said glass; and, h. moving said plunger in said barrel to force said liquid repair material to flow through said tip and through said adapter and to said crack in said glass.

5. A method according to claim 4 and comprising:

a. positioning the end of said tip of said syringe beyond said second end of said adapter.

6. A method according to claim 4 and comprising:

a removing said adapter from said glass.

7. A method according to claim 4 and comprising:

a. removing said adapter from the vicinity of said crack of glass and from said glass; and, b. finishing said glass in the area of said crack of glass and said repair material to present a finished appearance.

8. A method according to claim 4 and comprising:

a. said adapter being deformable.

* * * * *